US008252257B2

(12) United States Patent
Iizuka et al.

(10) Patent No.: US 8,252,257 B2
(45) Date of Patent: Aug. 28, 2012

(54) METHOD FOR PURIFYING GAS, GAS PURIFYING APPARATUS, AND GAS PURIFYING CATALYST

(75) Inventors: Hidehiro Iizuka, Mito (JP); Noriko Yoshida, Hitachinaka (JP); Yoshinori Nagai, Hiroshima (JP)

(73) Assignee: Babcock-Hitachi K.K., Tokyo (JP)

( * ) Notice: Subject to any disclaimer, the term of this patent is extended or adjusted under 35 U.S.C. 154(b) by 1128 days.

(21) Appl. No.: 11/837,035

(22) Filed: Aug. 10, 2007

(65) Prior Publication Data

US 2008/0072581 A1    Mar. 27, 2008

(30) Foreign Application Priority Data

Sep. 25, 2006    (JP) ................................ 2006-258232

(51) Int. Cl.
*B01D 53/56* (2006.01)
*B01J 23/52* (2006.01)
(52) U.S. Cl. ..................................... 423/213.2; 60/274
(58) Field of Classification Search .................. 502/304; 423/213.2; 60/274
See application file for complete search history.

(56) References Cited

U.S. PATENT DOCUMENTS

| | | | |
|---|---|---|---|
| 7,316,806 B2 * | 1/2008 | Okuno et al. ................... | 423/651 |
| 7,713,908 B2 * | 5/2010 | Yamamoto et al. ............ | 502/300 |
| 8,061,120 B2 * | 11/2011 | Hwang ............................ | 60/273 |
| 2002/0025905 A1 * | 2/2002 | Harris et al. .................... | 502/309 |
| 2003/0185736 A1 * | 10/2003 | Hatanaka et al. .............. | 423/263 |
| 2006/0043651 A1 | 3/2006 | Yamamoto et al. | |
| 2008/0020922 A1 * | 1/2008 | Li et al. .......................... | 502/73 |
| 2008/0075646 A1 * | 3/2008 | Mussmann et al. ........ | 423/213.2 |

FOREIGN PATENT DOCUMENTS

| | | |
|---|---|---|
| CA | 2382236 | 10/2002 |
| CN | 1171063 A | 1/1998 |
| EP | 0789621 | 5/1999 |
| FR | 2771310 | 5/1999 |
| JP | 6-29137 | 4/1994 |
| JP | 6-219721 | 8/1994 |
| JP | 2001-508360 | 6/2001 |
| JP | 2002-173370 | 6/2002 |
| JP | 2002-282689 | 10/2002 |

OTHER PUBLICATIONS

Notice of Rejection in Canadian Patent Application No. 2,596,453 issued Jan. 8, 2010.
Office Action dated Jul. 17, 2009 in corresponding Chinese Patent Application No. 2007-10141301.6.
Office Action in Canadian Patent Application No. 2,596,453 dated Dec. 2, 2010.

* cited by examiner

*Primary Examiner* — Wayne Langel
(74) *Attorney, Agent, or Firm* — Brundidge & Stanger, P.C.

(57) ABSTRACT

This invention provides a method involving the use of a non-ammonia-based deNOx catalyst for reducing the amount of NOx in exhaust combustion gas discharged from a boiler and an internal-combustion engine, wherein NOx and CO contained in exhaust gas are allowed to selectively react to reduce and remove NOx. This method involves the use of a catalyst comprising a cerium-zirconium composite oxide with Au supported thereon or a catalyst comprising a cerium-oxide-containing porous carrier with zirconium and Au supported thereon. Use of such catalyst enables purification of NOx and CO in exhaust gas and also enables generation of hydrogen.

4 Claims, 11 Drawing Sheets

METHOD FOR PURIFYING GAS, GAS PURIFYING APPARATUS, AND GAS PURIFYING CATALYST

TECHNICAL FIELD

The present invention relates to a method for purifying gas and particularly to a method for purifying nitrogen oxide or carbon monoxide in exhaust gas. The present invention also relates to a gas purifying apparatus and a gas purifying catalyst used for such method.

BACKGROUND ART

For the purpose of environmental improvement, reduction of harmful substances in exhaust combustion gas, such as CO (carbon monoxide), NOx (nitrogen oxide), and HC (hydrocarbon), from the internal-combustion engine has been desired. Meanwhile, reduction of greenhouse gas, i.e., $CO_2$ (carbon dioxide), is desired for the purpose of global warming prevention. In order to simultaneously attain the goals of reduction of $CO_2$ and reduction of CO, NOx, and HC, removal of such substances with the use of a catalyst has been examined.

As a method for reducing NOx, CO, and HC from the exhaust combustion gas of an automobile, a method for operating a three-way catalyst has been known. It is said that a three-way catalyst effectively functions when the internal-combustion engine is under rich fuel operation; however, such catalyst is not effective when the internal-combustion engine is under lean fuel operation. Thus, the effective use of such catalyst cannot be simultaneously pursued with the reduction of $CO_2$ while the internal-combustion engine is under lean fuel operation.

As a method for reducing NOx from the exhaust combustion gas of a boiler, a method using an ammonia-based deNOx catalyst has been known. Since the method using an ammonia-based deNOx catalyst is effective under lean fuel operation, $CO_2$ can be reduced while NOx is removed. This method, however, requires the use of an apparatus and a method for separately adding ammonia to exhaust gas.

Further, as a method for reducing NOx from exhaust combustion gas, a method involving the use of a non-ammonia-based deNOx catalyst has been examined (i.e., a method using an NOx selective reduction catalyst that allows selective reaction of NOx and CO contained in exhaust gas to reduce and remove NOx). An example of an NOx selective reduction catalyst is a gold-based catalyst.

JP Patent Publication (kokoku) No. 6-29137 (B) 1994 discloses a catalyst comprising gold particles supported on titanium oxide. Also disclosed is a method for preparing an Au catalyst wherein the pH level of a starting gold chloride solution is adjusted to 5 to 9 to prepare Au microparticles. It should be noted that a pH level exceeding 9 results in significantly deteriorated catalytic capacity.

JP Patent Publication (kohyo) 2001-508360 (A) discloses the use of a composite catalyst of aluminum oxide, zirconium oxide, cerium oxide, titanium oxide, silicon oxide, or a mixture thereof with Au and a transition metal as a catalyst for reducing nitrogen oxide.

JP Patent Publication (kokai) No. 6-219721 (A) 1994 discloses a catalyst for oxidizing CO comprising at least one member selected from the group consisting of Rh, Ru, Pd, Os, Ir, and Au incorporated into at least one oxide selected from the group consisting of $CeO_2$, $ZrO_2$, $TiO_2$, and $SnO_2$.

However, further improvement in the capacity of such catalysts for purification is desired.

DISCLOSURE OF THE INVENTION

An object of the present invention is to further improve the capacity of an Au-based gas purifying catalyst. Another object of the present invention is to provide an apparatus for purifying gas that effectively purifies components in exhaust gas, particularly NOx and CO, with the use of a catalyst.

An aspect of the present invention to attain the above objects relates to a gas purifying catalyst comprising a carrier capable of absorbing and releasing oxygen and gold or a gold compound supported on such carrier. In the case of a gas purifying catalyst comprising Au supported on a carrier capable of absorbing and releasing oxygen, active oxygen is likely to be supplied to the Au/carrier interface. Thus, NO oxidation and selective reduction reaction of NOx with CO are considered to be effectively carried out. A specific example of such carrier is a carrier comprising a cerium-zirconium composite oxide.

Another aspect of the present invention to attain the above objects relates to an exhaust gas purifying catalyst comprising a cerium-oxide-containing porous carrier and zirconium or a zirconium compound and gold or a gold compound supported on such carrier.

With the use of such purifying catalyst, NOx (nitrogen oxide) and CO (carbon monoxide) in the gas can be purified with high efficiency.

The other aspect of the present invention concerns an exhaust gas purifying apparatus that utilizes the aforementioned purifying catalyst and that is provided in an exhaust gas passage of a boiler, an automobile internal-combustion engine, or the like. With the use of such apparatus for purifying gas, a boiler, an automobile, and the like with high environmental performance can be provided. With the use of the catalyst of the present invention, selective reduction reaction of NO with CO that are present in exhaust gas is accelerated, NO and CO are simultaneously purified with high efficiency, and the capacity for purifying exhaust gas is improved. Accordingly, use of the catalyst of the present invention is effective for a method for purifying exhaust gas and for an apparatus for purifying exhaust gas from an internal-combustion engine under lean fuel operation.

EFFECTS OF THE INVENTION

Use of the exhaust gas purifying catalyst of the present invention enables purification of NOx and CO with high efficiency.

Use of the catalyst of the present invention enables effective purification of NOx or CO contained in the exhaust gas of an internal-combustion engine.

PREFERRED EMBODIMENTS OF THE INVENTION

Figure 1:
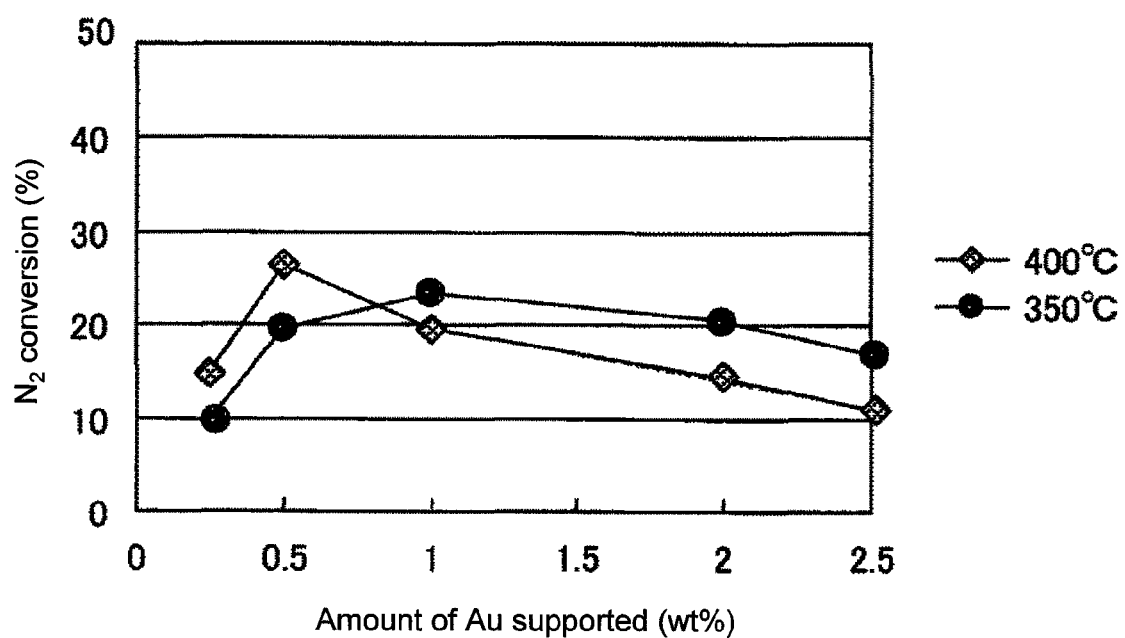
FIG. 1 shows dependence of $N_2$ conversion on the amount of supported Au.

Under lean fuel operation, the $NO_2$—CO combination had been reported to be the most effective combination in terms of reactivity between NOx and a reducing agent in exhaust gas. Specifically, a NOx species contained in exhaust gas is preferably $NO_2$. The most suitable reducing agent is CO. Further, the reactivity with other substances is as shown below:

$(NO_2$ and $CO)>(NO$ and $CO)>(NO_2$ and $H_2)>(NO_2$ and $C_3H_6)>(NO$ and $C_3H_6)$.

As carriers of gold-based catalysts, MgO, $Al_2O_3$, $TiO_2$, $Fe_2O_3$, ZnO, $MnFe_2O_4$, $NiFe_2O_4$, $ZnFe_2O_4$, $NiFe_2O_4$, and $ZrO_2$ have been reported (Haruta et al., Masakazu Iwamoto (ed.), Handbook of Environmental Catalyst, NTS, 2001, pp. 464-472). The percentage of NOx of the $Au/Al_2O_3$ catalyst converted into $N_2$ (hereafter referred to as the "$N_2$ conversion") is about 5% at maximum. By mixing $Au/Al_2O_3$ with $Mn_2O_3$, $N_2$ conversion of the catalyst is improved to about 21% at maximum for the following reasons. That is, NO is oxidized to $NO_2$ on $Mn_2O_3$ (represented by formula (1)), and $NO_2$ reacts with CO on $Au/Al_2O_3$ to result in $N_2$ (represented by formula (2)).

$$NO+0.5O_2 \rightarrow NO_2 : Mn_2O_3 \qquad (1)$$

$$NO_2+2CO \rightarrow 0.5N_2+2CO_2 : Au/Al_2O_3 \qquad (2)$$

The present inventors deduced that the capacity of interest would be further improved upon NO—CO reaction.

The reaction of reducing 1 mole of $NO_2$ requires 2 moles of CO. If NO reacts with CO as shown in formula (3), however, 1 mole of CO would be required for each mole of NO. Since the amount of reducing agent in exhaust gas is limited, the NO—CO reaction is considered preferable in order to enhance the efficiency of NOx purification.

$$NO+CO \rightarrow 0.5N_2+CO_2 \qquad (3)$$

The present inventors have conducted concentrated studies regarding a catalyst that allows NO to react with CO in the oxidative atmosphere. As a result, they discovered that a catalyst comprising Au supported on a carrier capable of absorbing and releasing oxygen would be preferable.

With the use of the catalyst of the present invention, the reactivity between NOx and reducing agents is as shown below:

$(NO$ and $CO)>(NO$ and $C_3H_6)>(NO$ and $H_2)>(NO_2$ and $CO)$.

Although the details of the reactions have not yet been elucidated, the reactions are considered to occur as follows.

The NO—CO reaction advances by the reaction of NO with CO adsorbed on the catalyst surface. When Au is supported on a carrier capable of absorbing and releasing oxygen, a large number of active sites capable of adsorbing NO are generated at the contact interface between Au and a carrier. By the reaction of such adsorbed NO with CO, NO selective reduction represented by formula (3) advances. In order to generate a large number of active sites, a catalyst comprising a carrier with Au supported thereon is superior to a mere mixture of compounds in terms of capacity.

When NOx is purified in accordance with a conventional mechanism, a carrier having a high capacity for supplying active oxygen that is effective for oxidation is preferable to a catalyst capable of merely oxidizing NO. Specifically, a carrier capable of absorbing and releasing oxygen is preferable for the following reasons. That is, upon effective supply of active oxygen to the Au/carrier interface, oxidation of NO advances and selective reduction reaction of NOx with CO effectively advances.

CO that was not used in the reaction reacts with active oxygen and such CO is removed as $CO_2$. Accordingly, NOx purification and CO purification can be simultaneously performed. Preferably, the capacity of the carrier to absorb and release oxygen is 100 μmol-$O_2$/g, and more preferably 100 μmol-$O_2$/g of the carrier.

In particular, a carrier comprising a cerium-zirconium composite oxide or a cerium-oxide-containing porous carrier with zirconium supported thereon is preferable to a carrier consisting of cerium oxide or zirconium oxide or a carrier comprising a mixture of cerium oxide and zirconium oxide. Use of a carrier comprising a cerium-zirconium composite oxide can prevent Au from being supported on zirconium oxide. Consequently, the contact efficiency between Au and cerium can be improved. Also, cerium, zirconium, and Au become very close to one another, and lowering of capability due to cerium aggregation and Au aggregation can be inhibited.

A catalyst comprising a cerium-oxide-containing porous carrier with zirconium and Au supported thereon instead of a composite oxide is also preferable because cerium, zirconium, and Au can be located very closely to one another. A catalyst comprising a cerium-oxide-containing porous carrier, zirconium supported thereon, and Au supported thereon is preferable.

A cerium-zirconium composite oxide can be generated by any method. An example thereof is coprecipitation. Zirconium can be supported on cerium oxide by impregnating a porous cerium carrier with a zirconium-containing solution, for example.

In order to improve the contact efficiency between Au and cerium and the dispersibility of Au, a cerium carrier is preferably impregnated with a zirconium-containing solution. Zirconium is deduced to inhibit aggregation of Au and to be capable of improving the thermostability of cerium oxide.

A composite oxide comprising an oxide capable of absorbing and releasing oxygen in combination with Au is also preferable. This is because formation of a composite oxide with Au results in improvement in the contact efficiency between Au and an oxide capable of absorbing and releasing oxygen at the atomic level.

Also, formation of a nanocluster results in the expression of specific catalytic activity. Accordingly, it is preferable that Au of 20 nm or smaller be supported on a carrier.

A porous carrier can use a mixture with cerium oxide or a composite oxide. This can improve heat resistance. In particular, a mixture of oxides of at least two elements selected from among cerium, zirconium, praseodymium, neodymium, terbium, samarium, gadolinium, and lanthanum or a composite oxide thereof is preferable. A mixture of oxides of cerium, zirconium, praseodymium, and neodymium or a composite oxide is particularly preferable as a carrier.

As the form of NOx in exhaust gas, NO is preferable to $NO_2$ for the Au catalyst of the present invention. With the use of the Au catalyst of the present invention, specifically, the NO—CO reaction is more likely to advance compared with the $NO_2$—CO reaction, and the order of reactivity between NOx and a reducing agent differs from the order according to a conventional technique. The catalyst of the present invention exhibits higher activity with every type of NOx than conventional catalysts. The catalyst of the present invention is particularly preferable for an internal-combustion engine under lean fuel operation where NO is more likely than $NO_2$ to be generated.

As a form of NOx, NO is preferable to $NO_2$ for the following reasons. With the use of the Au catalyst of the present invention, it is considered that the reaction advances at the contact interface between Au and a carrier capable of absorbing and releasing oxygen. At the contact interface, active oxygen is supplied from the carrier, NO and CO are supplied from the gas phase, and the NOx-CO reaction and the CO oxidation advance. $NO_2$ resulting from the reaction between active oxygen and NO at the contact interface has higher activity than $NO_2$ resulting from the gas phase. Thus, reduction with CO is accelerated.

When exhaust gas contains $NO_2$, an apparatus for converting $NO_2$ into NO is preferably provided upstream of the Au catalyst of the present invention. An example of such apparatus is an $NO_2$ converter that allows the $NO_2$-containing exhaust gas to pass through the apparatus, which is regulated at a predetermined temperature, to decompose $NO_2$ into NO. $NO_2$ is likely to decompose into NO and $O_2$ upon temperature increase in terms of the equilibrium. For example, about 80% of $NO_2$ could be decomposed into NO at about 500° C.

With the use of the Au catalyst of the present invention, the reaction between CO and water vapor advances, and hydrogen is then generated. Hydrogen has drawn attention as an energy alternative to fossil fuels. Thus, the catalyst of the present invention can be used as a catalyst for generating hydrogen. JP Patent Publication (kokai) No. 2002-173370 A discloses a method for generating hydrogen by a CO shift reaction wherein CO is allowed to react with water vapor on a catalyst to generate hydrogen (formula (4)).

$$CO+H_2O \rightarrow CO_2+H_2 \quad (4)$$

As a catalyst, $Pt/TiO_2$ or the like has been suggested.

With the use of the catalyst of the present invention, hydrogen is effectively generated by the CO shift reaction. Accordingly, a method for generating hydrogen wherein gas containing CO and water vapor is supplied to the aforementioned Au catalyst to generate hydrogen is proposed. Also, an apparatus for generating hydrogen equipped with a mechanism whereby supplying gas containing CO and water vapor to the upstream region of the Au catalyst is proposed. In order to maintain the predetermined reaction temperature, an apparatus for heating a CO— or water-vapor-containing gas to the predetermined temperature or an apparatus for heating the Au catalyst of the present invention may be provided. Water vapor may be added after the CO-containing gas is heated. Alternatively, CO and water vapor may be simultaneously heated. In either case, the reaction temperature should reach the temperature at which the CO shift reaction takes place when the Au catalyst of the present invention is brought into contact with CO and water vapor.

Further, hydrogen generated with the use of the aforementioned apparatus may be used as a reducing agent to improve capacity for purifying exhaust gas.

The Au catalyst of the present invention can be prepared by, for example, coprecipitation, homogeneous deposition-precipitation, dripping neutralization-precipitation, addition of a reducing agent, neutralization-precipitation via pH regulation, addition of carboxylic acid metal salt, impregnation, or kneading.

The present inventors discovered that the method described below would be particularly preferable. At the outset, a chloroauric acid solution is adjusted to a pH level of 10 or 11 and temperature of 50° C. to 60° C. For example, a 0.1 N NaOH solution is added dropwise to a gold chloride solution heated in a warm bath at 50° C. to 60° C. to adjust the pH level to 10 to 11. Preferably, a dehydrated carrier capable of absorbing and releasing oxygen is introduced into the gold-containing solution, and the resultant is agitated at 50° C. to 60° C. for about 1 hour. After agitation, the resultant is allowed to mature at room temperature overnight, followed by rinsing and filtration. The filtrate is dehydrated and then baked. JP Patent Publication (kokoku) No. 6-29137 (B) 1994 discloses that a pH level of the solution exceeding 9 results in inhibition of preparation of Au microparticles. When the carrier capable of absorbing and releasing oxygen of the present invention was used, preparation of Au microparticles was further accelerated by adjusting the pH level to 10 to 11. When a solution adjusted to the pH level of 6 to 8 was used, the diameters of Au crystal particles of the Au catalyst were 20 to 25 nm. When a solution adjusted to the pH level of 10 to 11 was used, however, the diameters of Au crystal particles of the Au catalyst were several nm. By maintaining the temperature of the solution at 50° C. to 60° C., preparation of Au microparticles was further accelerated.

The Au catalyst powder prepared by the above method can be used in the form of particles, columns, plates, and the like. Also, a cordierite honeycomb or metal honeycomb can be coated with such powder. Further, the inner or outer wall of a metal mesh or tube can be coated with such powder, for example.

EXAMPLES

Examples of the present invention are presented below, although the technical scope of the present invention is not limited thereto.

As described above, the present invention concerns an exhaust gas purifying catalyst comprising a carrier capable of absorbing and releasing oxygen with Au supported thereon. Hereafter, specific constitutions of the present invention are further described.

According to an embodiment of the present invention, a carrier capable of absorbing and releasing oxygen is a cerium-zirconium composite oxide.

According to another embodiment of the present invention, the catalyst comprises a cerium-oxide-containing porous carrier with zirconium and Au supported thereon.

According to another embodiment of the present invention, the cerium-oxide-containing porous carrier comprises a mixture of oxides of at least two elements selected from among cerium, zirconium, praseodymium, neodymium, terbium, samarium, gadolinium, and lanthanum or a composite oxide thereof.

According to another embodiment of the present invention, the carrier capable of absorbing and releasing oxygen comprises a mixture of oxides of cerium, zirconium, praseodymium, and neodymium or a composite oxide thereof.

According to the present invention, the amount of Au supported is 0.4% to 2% by weight, preferably 0.5% to 2% by weight, more preferably 0.4% to 1% by weight, and further preferably 0.5% to 1% by weight, relative to a carrier capable of absorbing and releasing oxygen.

When the cerium-zirconium composite oxide according to the present invention is used as a carrier, the cerium:zioconium molar ratio is preferably the cerium:(cerium+zirconium) molar ratio of 0.2:1.0 to 1.0:1.0, more preferably 0.4:1.0 to 0.8:1.0, and particularly preferably 0.5:1.0 to 0.8:1.0.

When zirconium is supported on a cerium-oxide-containing porous carrier, the cerium:(cerium+zirconium) molar ratio of 0.6:1.0 to 0.9:1.0 is preferable.

According to the present invention, NO oxidation and NOx reduction are carried out on the same carrier. Accordingly, the reactivity of NO—CO selective reduction can be improved, and CO can be oxidized and removed.

When a mixed catalyst comprising an NO oxidation catalyst and a NOx reduction catalyst is used, the NOx reduction performance may decline if NO cannot be brought into contact with a NOx reduction catalyst following NO oxidation. Also, if NO is brought into contact with the NOx reduction catalyst before NO in exhaust gas is brought into contact with the NO oxidation catalyst, the efficiency for NOx reduction may decline. Accordingly, the NO oxidation catalyst and the NOx reduction catalyst must be mixed in such a manner that they are uniformly dispersed, in order to improve the efficiency for NOx reduction. Such drawback can be easily avoided by performing NO oxidation and NOx reduction on the same carrier.

When the catalyst of the present invention is used, if the $O_2$ concentration is set 0.01% or lower, $N_2$ conversion of 95% or higher can be attained. In order to realize constantly high $N_2$ conversion, accordingly, the $O_2$ concentration in the gas is preferably set at 0.01% or lower. An internal-combustion engine comprising the catalyst of the present invention provided in an exhaust gas passage can produce the high capacity for purifying NOx and CO when lean combustion and stoichiometric or rich combustion are repeated. The apparatus for purifying gas provided in an exhaust gas passage of the internal-combustion engine that repeats lean combustion and stoichiometric or rich combustion using the catalyst of the present invention accordingly exhibits a high capacity for purification. Also, a method for purifying exhaust gas wherein lean exhaust combustion gas and stoichiometric or rich exhaust combustion gas are alternately supplied to the catalyst of the present invention and exhaust gas is then purified is preferable.

When the Au catalyst of the present invention is used for the CO shift reaction, the amount of Au supported is preferably 0.5% to 2% by weight of a carrier capable of absorbing and releasing oxygen. By increasing the amount of Au supported, the amount of hydrogen generated by the CO shift reaction increases; however, the amount of expensive Au used disadvantageously increases. When the cerium-zirconium mixture or composite oxide of the present invention is used as a carrier, the cerium:zirconium molar ratio is preferably the cerium:(cerium+zirconium) molar ratio of 0.2:1.0 to 0.8:1.0, and more preferably 0.5:1.0 to 0.7:1.0.

The CO shift capacity of the catalyst of the present invention can be applied for purification of NOx in exhaust gas emitted by the internal-combustion engine of an automobile or the like. Specifically, a NOx trap catalyst is provided downstream of the catalyst of the present invention in an exhaust gas passage. The NOx trap catalyst is capable of trapping (absorbing or chemically adsorbing) NOx under lean conditions and is capable of reducing and purifying the trapped NOx under rich conditions. Hydrogen is optimal as an agent for reducing trapped NOx. The hydrogen content in exhaust gas from the internal-combustion engine is low under rich conditions. Thus, CO contained in exhaust gas in amounts of several % under rich conditions is used to generate hydrogen by a CO shift reaction with the aid of the catalyst of the present invention, and hydrogen is then supplied to the NOx trap catalyst located downstream. As a result, NOx is effectively reduced under rich conditions. Under lean conditions, the provision of the catalyst of the present invention can remove some NOx from exhaust gas with the aid of the catalyst of the present invention. This can reduce the NOx content in exhaust gas. This reduces the amount of NOx trapped by the NOx trap catalyst located downstream and also reduces the amount of the trapped NOx to be reduced under rich conditions. Thus, the amount of hydrogen required for purification under rich conditions can be reduced, which in turn improves the purification efficiency. The provision of the catalyst of the present invention upstream of the NOx trap catalyst can yield synergistic effects both under lean and rich conditions, which results in improved efficiency for NOx purification.

Similar effects can be attained by coating the upper layer of the NOx trap catalyst with the catalyst of the present invention. This can reduce the size of the space in which the catalyst is to be provided.

Exhaust gas from a fixed source such as a boiler may occasionally contain CO in addition to NOx. The process of treating exhaust gas from a fixed source generally involves the use of an ammonia-based or urea-based deNOx catalyst. The ammonia-based or urea-based deNOx catalyst comprises components such as Ti, W, and V, for example. Although such catalyst has sufficient capacity for allowing NOx to effectively react with ammonia so as to convert NOx to $N_2$, the capacity for CO removal is insufficient. Also, unused ammonia or the like may be disadvantageously discharged. Thus, it is preferable that the catalyst of the present invention be provided downstream of the ammonia-based or urea-based deNOx catalyst. As a result, the oxidation capacity of the catalyst of the present invention can be utilized to oxidize CO in exhaust gas to result in $CO_2$. Also, ammonia is oxidized to result in NOx so that discharge of ammonia can be inhibited.

The ammonia-based or urea-based deNOx catalyst and the catalyst of the present invention may be separately provided in the exhaust gas passage. Alternatively, a multilayer catalyst may be provided, which comprises a catalyst-supporting substrate, a layer of the catalyst of the present invention thereon, and a layer of the ammonia-based or urea-based deNOx catalyst thereon. After NOx has reacted with ammonia on the layer of the ammonia-based or urea-based deNOx catalyst, unused ammonia and CO are diffused on the underlying layer of the catalyst of the present invention, and they are oxidized to result in NOx and $CO_2$. NOx and $CO_2$ pass through the layer of the catalyst of the present invention to the layer of the ammonia-based or urea-based deNOx catalyst, and they are discharged from the catalyst layer. NOx generated on the layer of the catalyst of the present invention reacts with ammonia while passing through the layer of the ammonia-based or urea-based deNOx catalyst, and it is converted into the form of detoxified $N_2$. Thus, use of the multilayer catalyst enables simultaneous removal of NOx and CO.

Example 1

Example 1 describes preparation of the catalyst of the present invention comprising a carrier capable of absorbing and releasing oxygen with gold supported thereon and preparation of a catalyst of Comparative Example comprising a titanium compound carrier with gold supported thereon.

A cerium-zirconium composite oxide was used as a carrier capable of absorbing and releasing oxygen. The starting composite oxide was assayed by powder XRD analysis. As a result, the composition of the composite oxide of the carrier was found to be $Ce_{0.6}Zr_{0.4}O_2$. This composite oxide is denoted $Ce_{0.6}Zr_{0.4}O_2$. This composite oxide was found to contain, as trace elements, 3 wt % $La_2O_3$ and 7 wt % $Pr_6O_{11}$.

Catalyst 1 of Example

Catalyst 1 of Example comprises a $Ce_{0.6}Zr_{0.4}O_2$ carrier and, supported thereon, a gold solution (pH: 6.6). Catalyst 1 of Example was prepared in the following manner.

(1) $Ce_{0.6}Zr_{0.4}O_2$ was dehydrated in an electric furnace (90° C.) and cooled in vacuo. Moisture was removed therefrom.

(2) A chloroauric acid solution was mixed with purified water to adjust the Au concentration to 0.01 mol/l in the solution.

(3) The chloroauric acid solution was maintained at 60° C. in a warm bath, and a 0.1 mol/l of an NaOH solution was added dropwise thereto with agitation. The final pH level of the Au-containing solution was adjusted to 6.6.

(4) The dehydrated carrier was added to the Au-containing solution at a single instance, and the resultant was vigorously agitated using a magnetic stirrer. Agitation was carried out at 60° C. for 1 hour.

(5) After agitation, the resultant was allowed to stand at room temperature for 1 day.

(6) The residue was separated from the filtrate by suction filtration. The residue was washed with 1.5 l of purified water.

(7) The residue was dehydrated at 90° C. for 2 hours and then baked in an electric furnace at 400° C. for 3 hours.

Thus, Catalyst 1 of Example comprising a $Ce_{0.6}Zr_{0.4}O_2$ carrier and, supported thereon, 2 wt % Au (in terms of metal) was obtained.

(Catalyst 2 of Example)

Catalyst 2 of Example comprises a $Ce_{0.6}Zr_{0.4}O_2$ carrier and, supported thereon, a gold solution (pH: 10). Catalyst 2 of Example was prepared in the same manner in the case of Example 1, except that the pH level defined in (3) of Example 1 was adjusted to 10. As a result, Catalyst 2 of Example comprising the $Ce_{0.6}Zr_{0.4}O_2$ carrier and, supported thereon, 2 wt % Au (in terms of metal) was obtained.

(Catalyst 3 of Example)

Catalyst 3 of Example comprises a $Ce_{0.6}Zr_{0.4}O_2$ carrier and, supported thereon, a gold solution (prepared at room temperature). Catalyst 3 of Example was prepared in the following manner.

(1) $Ce_{0.6}Zr_{0.4}O_2$ was dehydrated in an electric furnace (90° C.) and cooled in vacuo. Moisture was removed therefrom.

(2) A chloroauric acid solution was mixed with purified water to adjust the Au concentration to 0.01 mol/l in the solution.

(3) The chloroauric acid solution was agitated at room temperature, and a 0.1 mol/l of an NaOH solution was added dropwise thereto. The final pH level of the Au-containing solution was adjusted to 6.6.

(4) The dehydrated carrier was added to the Au-containing solution at a single instance, and the resultant was vigorously agitated using a magnetic stirrer. Agitation was carried out at room temperature for 12 hours.

(5) After agitation, the resultant was allowed to stand at room temperature for 12 hours.

(6) The residue was separated from the filtrate by suction filtration. The residue was washed with 1.5 l of purified water.

(7) The residue was dehydrated at 90° C. for 2 hours and then baked in an electric furnace at 400° C. for 3 hours.

Thus, Catalyst 3 of Example comprising the $Ce_{0.6}Zr_{0.4}O_2$ carrier and, supported thereon, 2 wt % Au (in terms of metal) was obtained.

(Catalyst 1 of Comparative Example)

Catalyst 1 of Comparative Example comprised $TiO_2$ (anatase) as a carrier. Catalyst 1 of Comparative Example was obtained in the same manner in the case of Example 1 except for the use of $TiO_2$ instead of $Ce_{0.6}Zr_{0.4}O_2$. Thus, Catalyst 1 of Comparative Example comprising the $TiO_2$ carrier and, supported thereon, 2 wt % Au (in terms of metal) was obtained. It should be noted that $TiO_2$ is not capable of absorbing and releasing oxygen.

Text Example 1

Catalysts 1 to 3 of Example and Catalyst 1 of Comparative Example were subjected to quantitative analysis concerning the amounts of Au supported. All the amounts were found to be 2 wt % relative to the carrier.

Table 1 shows the results of powder XRD analysis of the diameters of Au crystal particles of Catalysts 1 to 3 of Example and Catalyst 1 of Comparative Example. Au in Catalysts 1 to 3 of Example and in Catalyst 1 of Comparative Example was found to be in the form of the Au metal. The catalysts were not subjected to special reduction treatment prior to the test.

The diameters of Au crystal particles were determined by Schieler's formula using the XRD peak of Au.

The diameter of the Au crystals of Catalyst 1 of Example was found to be 22 nm and that of the crystals of Catalyst 3 of Example was found to be 5 nm. In Catalyst 2 of Example, no XRD peak attributable to Au was observed. Thus, the diameters of Au crystal particles could not be determined; however, the diameters of Au crystal particles were deduced to be smaller than those of the crystals of Catalysts 1 and 3 of Example, i.e., smaller than 5 nm. Although the amounts of Au supported were the same, the diameters of Au crystal particles of Catalyst 3 of Example were found to be the smallest. This indicates that Au microparticles are satisfactorily dispersed on the carrier. Accordingly, it is deduced that the largest area of contact interface between NO carriers and Au particles enables effective supply of active oxygen to the Au/carrier interface and effective selective reduction reaction of NOx with CO.

When gold microparticles are supported on $Ce_{0.6}Zr_{0.4}O_2$, accordingly, preparation of microparticles could be more effectively realized with the use of the Au-containing solution at a pH level of 10 at about 60° C. than with the use of the Au-containing solution at a pH level of 6.6 at room temperature.

TABLE 1

| | Average diameter of Au crystal particles (nm) | |
|---|---|---|
| Catalyst | X-ray diffraction | X-ray diffraction peak |
| Catalyst 1 of Example | 22 | 22 |
| Catalyst 2 of Example | Smaller than 5 | Smaller than 5 |
| Catalyst 3 of Example | 5 | 5 |
| Catalyst 1 of Comparative Example | 24 | — |

The amounts of NO adsorbed by Catalyst 1 of Example and by Catalyst 1 of Comparative Example at 350° C. were measured. As a result of measurement, the amount of NO adsorbed by Catalyst 1 of Example was found to be 1.4 mmol/l, and that by Catalyst 1 of Comparative Example was found to be 0.5 mmol/l. This demonstrates that Catalyst 1 of Example has a larger number of sites capable of NO adsorption than Catalyst 1 of Comparative Example.

Example 2

In Example 2, the catalysts prepared above were modified into honeycomb forms, and the capacities thereof were evaluated. Honeycomb forms were coated with Catalysts 1 to 3 above and Catalyst 1 of Comparative Example, and the resultants were designated as Catalysts 4 to 6 and Catalyst 2 of Comparative Example, respectively. These catalysts were prepared in the following manner. Silica sol (50 g) and purified water (50 g) were kneaded in a mortar relative to 100 g each of Catalysts 1 to 3 above and Catalyst 1 of Comparative Example to prepare Au catalyst-containing slurries. The Cordierite honeycombs (400 cell/in$^2$) were wash-coated with the slurries, and the honeycombs were coated with the Au-containing catalyst in an amount of 190 g/l of honeycombs to obtain Catalysts 4 to 6 and Catalyst 2 of Comparative Example.

The gas having the composition as shown in Table 2 was used to inspect the capacity for purifying NOx and CO in accordance with the method of Test Example 2. Also, the capacity of catalysts for CO purification when temperature had been changed was inspected in accordance with the method of Test Example 3. Hereafter, the test examples and the results thereof are described.

Test Example 2

In evaluation, a fixed bed flow reaction tube was used. Catalysts 4 to 6 and Catalyst 2 of Comparative Example were used in amounts of 6 ml each (11 mm×11 mm×21 mm (length)).

TABLE 2

| Composition | Concentration (%) |
|---|---|
| NO | 0.01 |
| CO | 0.2 |
| $O_2$ | 7 |
| $H_2O$ | 10 |
| He | Balance |

A quartz reaction tube (inner diameter: 21 mm) was provided with a honeycomb catalyst and thermocouples (φ 0.5 mm, K pairs). The tips of 2 thermocouples were provided 10 mm above the upper end of the honeycomb catalyst and at the catalytic center. The reaction gas and the honeycomb catalyst were heated using the electric muffle furnace provided outside the quartz reaction tube. After the reaction gas and the honeycomb catalyst were heated to the predetermined temperature, the reaction gas having the composition shown in Table 2 was allowed to pass through the catalyst layer. The catalyst inlet temperature was 350° C. The reaction gas was provided from various gas-charging tanks. The space velocity (SV) was determined to be 15,000 h$^{-1}$. Under such conditions, about 90 l of gas was used relative to 1 g of the Au catalyst coating per hour. In this test, the catalyst was not subjected to any special reduction treatment prior to the reaction. After the reaction gas had passed through the catalyst layer, moisture was removed from the reaction gas with the use of a water trap, and the resulting gas was applied to an No/$NO_2$ analyzer (a chemiluminescence analyzer, CLA-510SS, Horiba Seisakusho) and an oximeter (a magnetic analyzer, CLA-510, Horiba Seisakusho). After moisture had been removed, the reaction gas was collected in a sampling bag and introduced into the thermal conductivity detecting gas chromatograph (GC164, Hitachi) to analyze the $N_2O$ concentration in the reaction gas. From the concentration of the supplied NO, the concentration of unreacted NO, that of generated $NO_2$, and that of $N_2O$ were subtracted. The determined value was designated as the concentration of generated $N_2$. Concentrations were measured at a steady state.

Conversion of NO into $NO_2$ was designated as $NO_2$ conversion. Conversion of NO into $N_2O$ was designated as $N_2O$ conversion. Also, conversion of NO into $N_2$ was designated as $N_2$ conversion.

$NO_2$ conversion, $N_2O$ conversion, $N_2$ conversion, and CO purification were determined by formulae (4) to (7), respectively.

$$NO_2 \text{ conversion}(\%) = (NO_2 \text{ concentration at catalyst outlet})/(NOx \text{ concentration at catalyst inlet}) \times 100 \quad (4)$$

$$N_2O \text{ conversion}(\%) = (\text{concentration of generated } N_2O)/(NOx \text{ concentration at catalyst inlet}) \times 100 \quad (5)$$

$$N_2 \text{ conversion}(\%) = (\text{concentration of generated } N_2)/(NOx \text{ concentration at catalyst inlet}) \times 100 \quad (6)$$

$$CO \text{ purification}(\%) = [1-(CO \text{ concentration at catalyst outlet}/CO \text{ concentration at catalyst inlet})] \times 100 \quad (7)$$

Table 3 shows the results of measurement at a steady state.

TABLE 3

| Catalyst | Temperature (° C.) | $NO_2$ conversion (%) | $N_2O$ conversion (%) | CO purification (%) | $N_2$ conversion (%) | |
|---|---|---|---|---|---|---|
| Catalyst 4 of Example | 350 | 16 | 0 | 100 | 12 | Good |
| Catalyst 5 of Example | 350 | 26 | 0 | 100 | 20 | Best |
| Catalyst 6 of Example | 350 | 20 | 0 | 100 | 18 | Better |
| Catalyst 2 of Comparative Example | 350 | 6 | 0 | 100 | 4 | Not good |

In the case of Catalysts 4 to 6 of Example, $N_2O$ conversion was 0% and CO purification was 100%. Catalyst 5 of Example exhibited the highest activity of $N_2$ conversion, followed by Catalyst 6 of Example, Catalyst 4 of Example, and then Catalyst 2 of Comparative Example, with Catalyst 5 of Example being the most preferable. When gold microparticles were to be supported on $Ce_{0.6}Zr_{0.4}O_2$, accordingly, it was confirmed that the catalyst would be effectively produced by adjusting the pH of an Au-containing solution to 10 and maintaining the temperature at about 60° C.

Test Example 3

CO purification of Catalyst 4 of Example, that of Catalyst 5 of Example, and that of Catalyst 2 of Comparative Example were inspected by changing the temperature (350° C.) designated in Test Example 2 to 100° C. to 300° C.

TABLE 4

| Temperature (° C.) | Catalyst 4 of Example | Catalyst 5 of Example | Catalyst 2 of Comparative Example |
| --- | --- | --- | --- |
| 100 |  | 74 | 14 |
| 150 |  | 80 | 55 |
| 175 |  | 83 | 71 |
| 200 | 98 | 100 | 95 |
| 300 | 100 | 100 | 100 |
| 350 (Table 3) | 100 | 100 | 100 |

Catalyst 5 of Example exhibited the higher capacity for CO purification than Catalyst 2 of Comparative Example at 100° C. to 200° C. Also, catalysts 4 and 5 of Example are superior to Catalyst 2 of Comparative Example in terms of CO purification at low temperatures.

Accordingly, the Au catalyst of the present invention was found to be excellent in CO purification at low temperatures.

Example 3

The amount of Au supported on the $Ce_{0.6}Zr_{0.4}O_2$ carrier was examined using Catalyst 5 of Example. The capacity was assayed in the same manner in the case of Test Example 2. Dependence of the amount of supported Au on $N_2$ conversion was first inspected. The amount of supported Au was determined in the following manner.

Percentage of supported Au=amount of supported Au/weight of carrier×100

FIG. 1 shows the results of measurement of $N_2$ conversion at 350° C. and 400° C. The maximum value was found to be attained with an amount of supported Au of 0.5 wt % at 350° C. Also, the maximum value was found to be attained with 1 wt % at 400° C. In neither case was generation of $N_2O$ observed. The results attained at 350° C. and at 400° C. indicate that an amount of supported Au of 0.4 wt % to 1 wt % is preferable.

Figure 2:
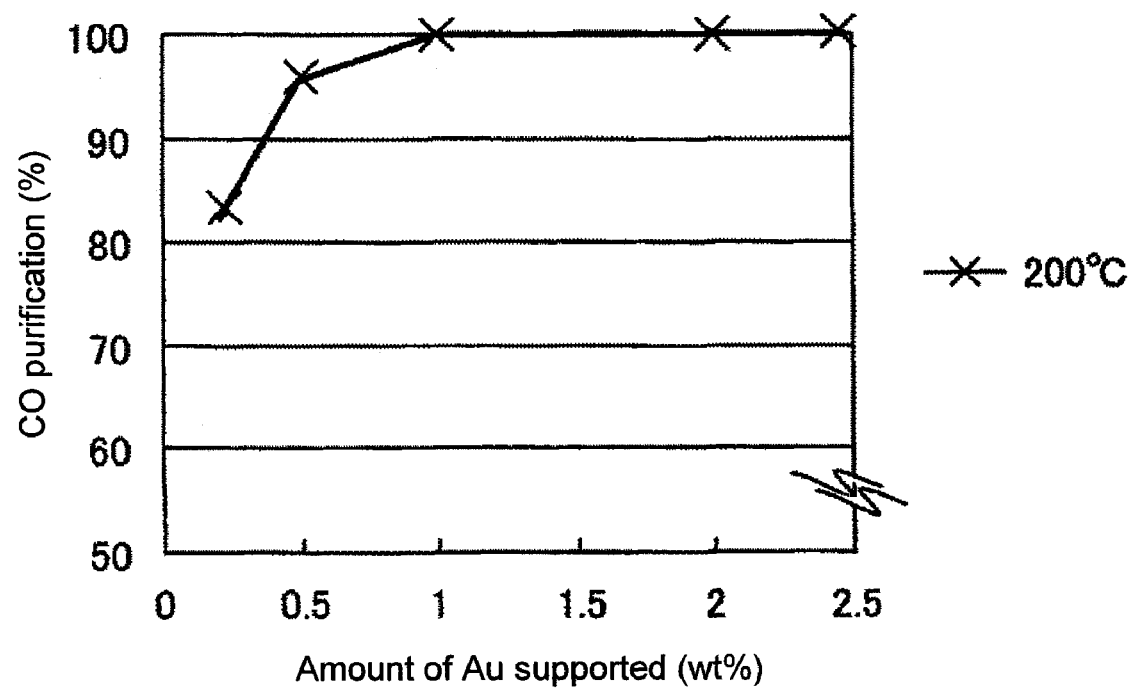
FIG. 2 shows dependence of the percentage of CO purification on the amount of supported Au.

Further, dependence of the amount of Au supported on the $Ce_{0.6}Zr_{0.4}O_2$ carrier on CO purification was inspected using Catalyst 5 of Example. FIG. 2 shows the results of measurement. At 300° C. or higher, CO was completely purified (100%) regardless of the amount of supported Au. At 200° C., however, 95% or more CO was purified with an amount of supported Au of 0.5 wt % or higher.

Therefore, an amount of supported Au of 0.5 wt % to 1 wt % was determined to be the most preferable in order to satisfactorily realize $N_2$ conversion and CO purification.

Example 4

The Ce:Zr molar ratio of the carrier comprising a cerium-zirconium composite oxide (hereafter referred to as the "Ce–Zr carrier") was examined. Composite oxides composed of Ce and Zr at different ratios were used, and the number of moles of Ce relative to the total number of moles of Ce and Zr was defined as Ce:(Ce+Zr). The capacity was assayed in the same manner in the case of Test Example 2. As with the case of Catalyst 5 of Example, a gold solution adjusted to 60° C. and pH 6.6 was used to prepare catalysts. Au supported on the carrier accounted for 1 wt %.

Figure 3:
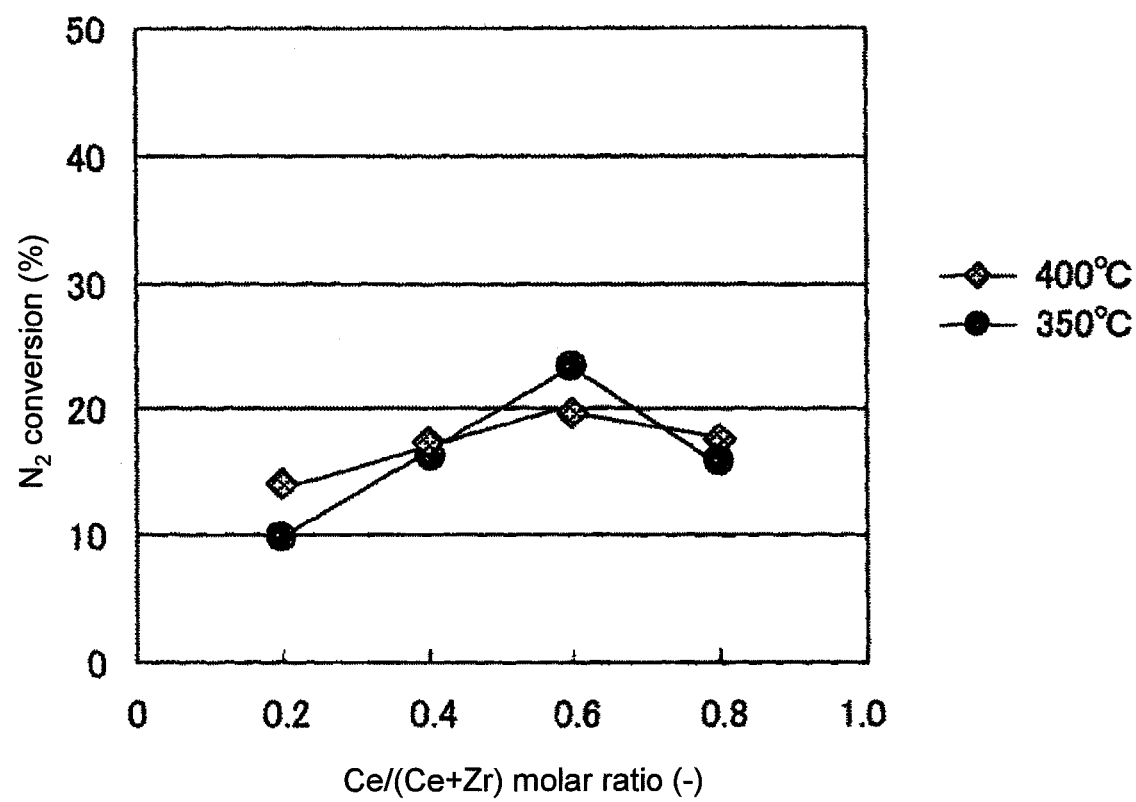
FIG. 3 shows dependence of $N_2$ conversion on Ce:(Ce+Zr) molar ratio.

FIG. 3 shows $N_2$ conversion relative to the Ce:(Ce+Zr) molar ratio. At 350° C. and 400° C., $N_2$ conversion reached the maximum value at a Ce:(Ce+Zr) molar ratio of 0.6:1.0. Thus, a Ce:(Ce+Zr) molar ratio of 0.2:1.0 to 0.8:1.0 is preferable. A Ce:(Ce+Zr) molar ratio of 0.4:1.0 to 0.8:1.0 is more preferable in order to attain $N_2$ conversion of about 18% or higher, and a molar ratio of 0.5:1.0 to 0.7:1.0 is particularly preferable in order to attain $N_2$ conversion of 20% or higher. In neither case was generation of $N_2O$ observed.

Figure 4:
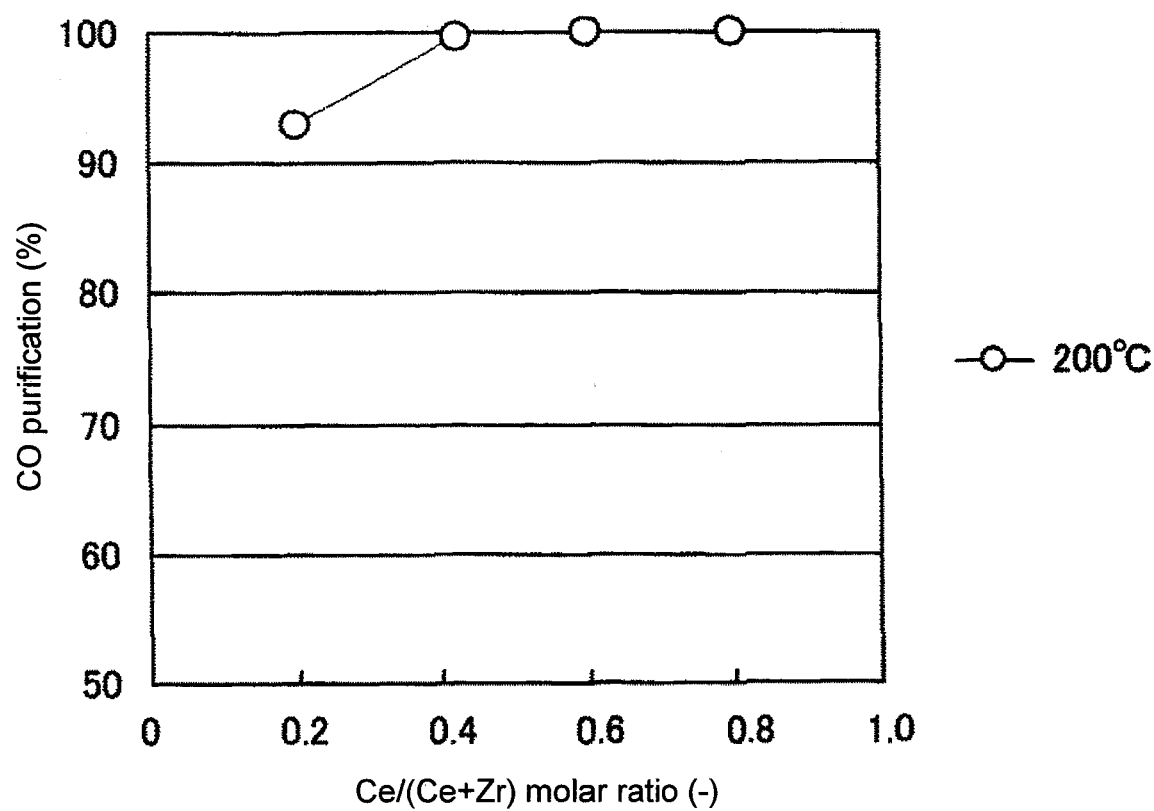
FIG. 4 shows dependence of the percentage of CO purification on Ce:(Ce+Zr) molar ratio.

FIG. 4 shows the percentage of purified CO relative to the Ce:(Ce+Zr) molar ratio. At 300° C. or higher, CO was completely purified (100%) regardless of the Ce:(Ce+Zr) molar ratio. At 200° C., however, 95% or more CO was purified with a Ce:(Ce+Zr) molar ratio of 0.3:1.0 or higher by weight.

Therefore, the preferable Ce:(Ce+Zr) molar ratio of the Ce–Zr carrier was determined to be 0.5:1.0 to 0.8:1.0 in order to satisfactorily realize $N_2$ conversion and CO purification.

Example 5

The capacity of Catalyst 4 of Example was inspected by replacing NO of Test Example 2 with $NO_2$. The resulting $N_2$ conversion was found to be 2%. Since such percentage was 12% in the case of NO, it would be preferable that NOx in exhaust gas be supplied in the form of NO. Supply of $NO_2$ in the form of NO is particularly preferable. In neither case was generation of $N_2O$ observed.

Example 6

Figure 5:
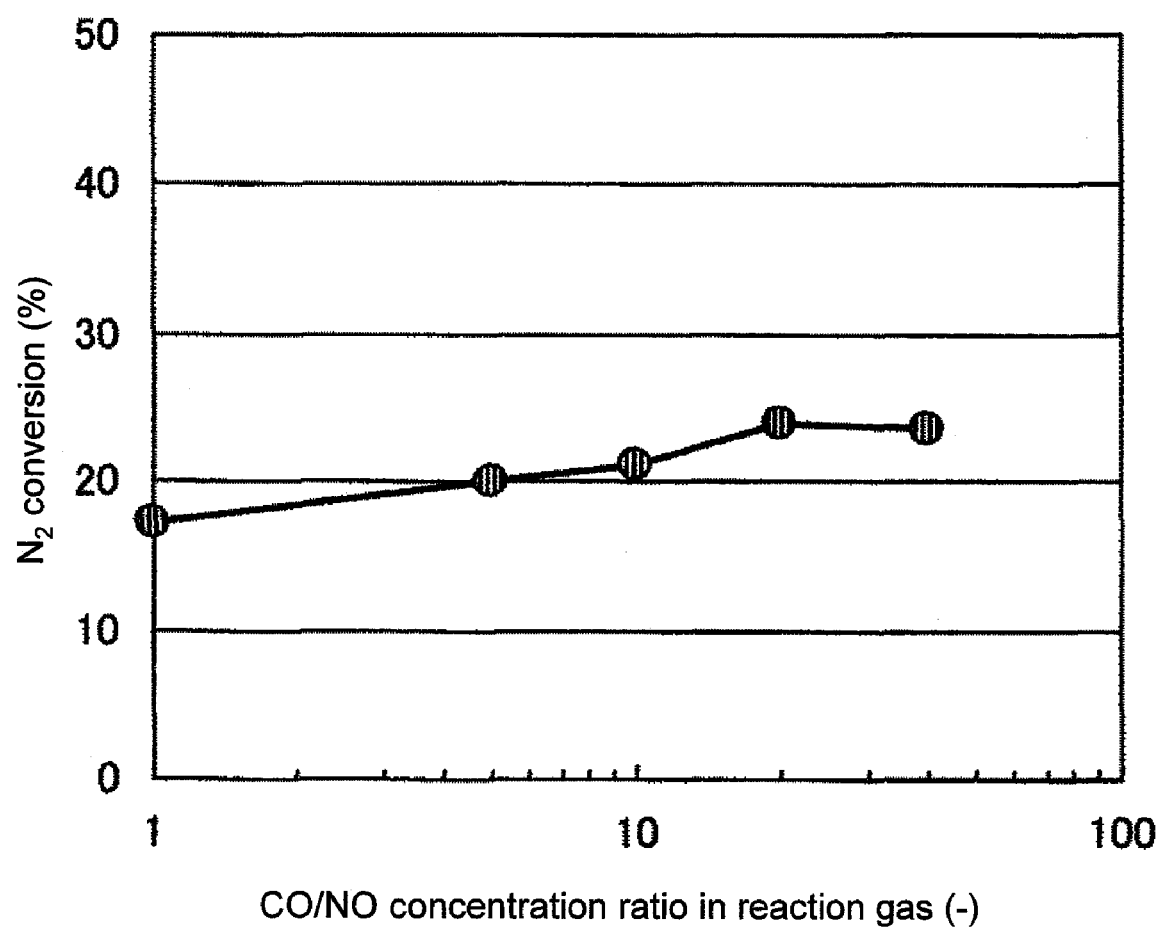
FIG. 5 shows dependence of $N_2$ conversion on CO:NO concentration ratio.

The capacity of Catalyst 4 of Example was inspected while changing the CO concentration employed in Test Example 2. FIG. 5 shows $N_2$ conversion at 400° C. when the CO:NO concentration ratio is 1:1 to 40:1. A CO:NO concentration ratio of 5:1 or higher is preferable, since it allows $N_2$ conversion of 20% or higher to be obtained. A CO:NO concentration ratio of 20:1 or higher is more preferable, since it allows $N_2$ conversion of about 23% to be obtained. At any CO:NO concentration ratio, CO was completely purified (100%). In neither case was generation of $N_2O$ observed.

Example 7

Figure 6:
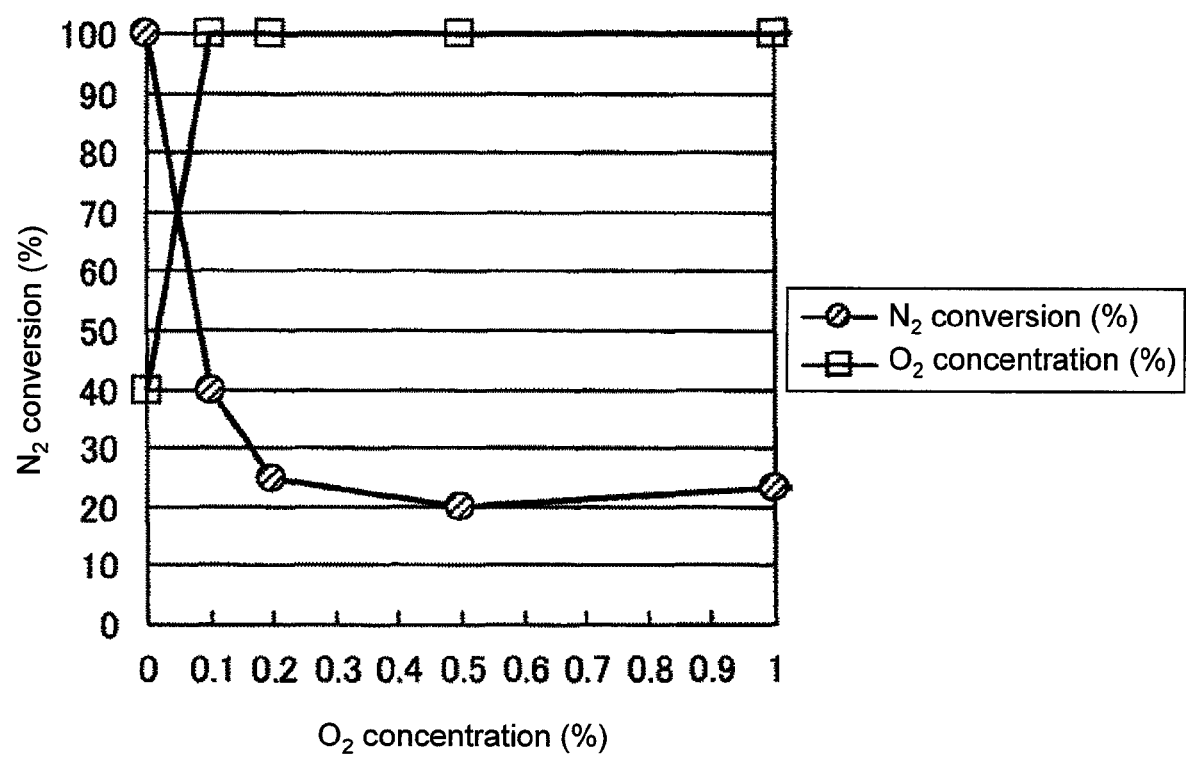
FIG. 6 shows dependence of $N_2$ conversion on $O_2$ concentration.

The capacity of Catalyst 4 of Example was inspected by changing the $O_2$ concentration of Test Example 2 to 0% to 1%. FIG. 6 shows $N_2$ conversion at 350° C. When the $O_2$ concentration was determined to be 0.2% or lower, $N_2$ conversion was rapidly increased to 20% or higher. Accordingly, the $O_2$ concentration is preferably 0.2% or lower. The percentage of purified CO was also increased.

Further, when the $O_2$ concentration was determined to be 0.01% or lower, $N_2$ conversion would be 95% or higher. Accordingly, it is preferable that the $O_2$ concentration be 0.01% or lower in order to realize constantly high $N_2$ conversion.

Example 8

The capacity for NOx purification and the capacity for CO purification when the amount of oxygen had been changed were inspected.

With the use of Catalyst 4 of Example, the reaction gas as shown in Table 2 was allowed to flow for 3 minutes in accordance with the method of Test Example 2, and the reaction gas was further allowed to flow for 3 minutes while changing the $O_2$ concentration to 0%. This procedure was alternately repeated. Gas with the oxygen concentration of 0% represents, for example, exhaust gas from the internal-combustion engine of an automobile in the case of combustion under rich fuel operation (stoichiometric or rich combustion) at the theoretical air fuel ratio or lower. When the oxygen concentration is 6%, such gas represents exhaust gas in the case of combustion under lean fuel operation (lean combustion) having a higher value than the theoretical air fuel ratio. The temperature was set at 350° C. As a result of measurement, the capacity for NOx purification was found to be 70%. The percentage of purified CO was found to be 95%.

Accordingly, an apparatus for purifying exhaust gas from an automobile or the like that repeats lean combustion and stoichiometric or rich combustion can produce a high capacity for NOx and CO purification with the location of the catalyst of the present invention in the exhaust gas passage and with the use of the same for purification.

Example 9

Figure 7:
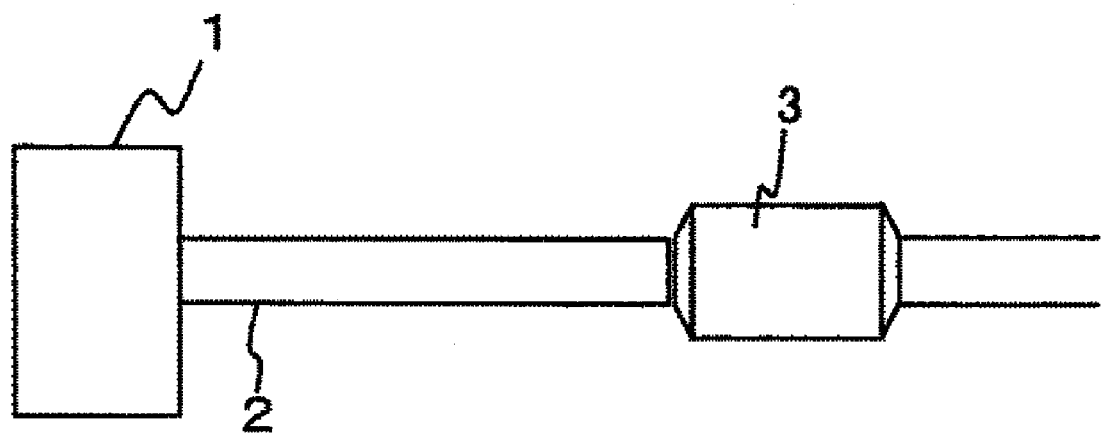
FIG. 7 shows an example of an apparatus for purifying gas comprising an Au catalyst.
Figure 8:
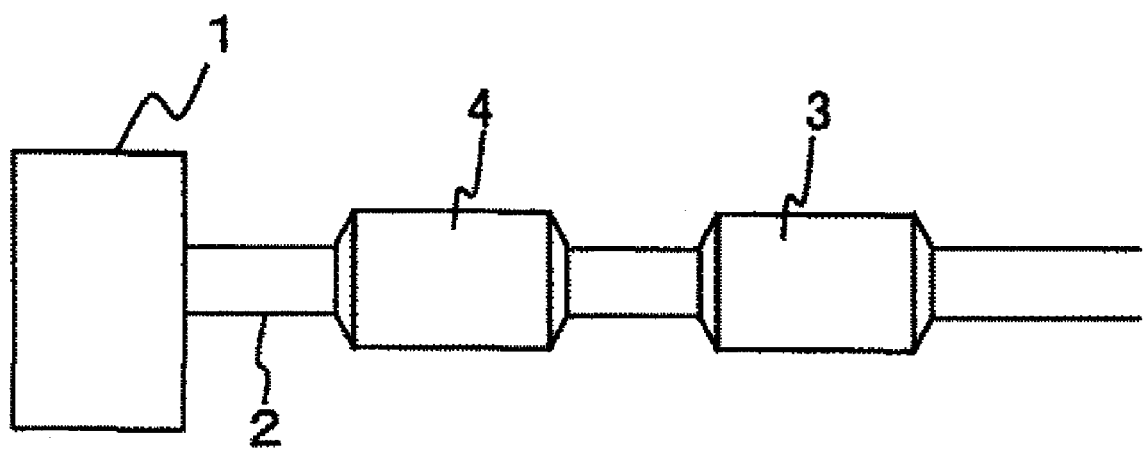
FIG. 8 shows an example of an apparatus for purifying gas equipped with an apparatus for decomposing $NO_2$.

FIG. 7 and FIG. 8 each show an example of an apparatus for purification using an exhaust gas purifying catalyst 3 involving the use of an Au catalyst.

FIG. 7 shows an example of an apparatus for purifying exhaust gas discharged from an internal-combustion engine equipped with an exhaust gas purifying catalyst. Exhaust gas discharged from the internal-combustion engine 1 is supplied to the exhaust gas purifying catalyst 3 through the exhaust gas passage 2, and NOx and CO in exhaust gas are removed.

FIG. 8 shows an example of an apparatus for purifying gas, which further comprises an apparatus for decomposing $NO_2$. Exhaust gas discharged from the internal-combustion engine 1 is supplied to the apparatus 4 for decomposing $NO_2$ through the exhaust gas passage 2. After $NO_2$ in exhaust gas is decomposed into NO, the resultant is supplied to the exhaust gas purifying catalyst 3, and NOx and CO in exhaust gas are then removed.

Example 10

The amount of generated hydrogen was inspected using a catalyst prepared by changing the amount of supported Au of Catalyst 5 of Example to 0.5 wt % to 2 wt %. The amount of generated hydrogen was inspected in the following Test Example 3.

Test Example 3

The amount of generated hydrogen resulting from the CO shift reaction was inspected using gas having the composition as shown in Table 5. In evaluation, a fixed bed flow reaction tube was used. The catalyst was used in an amount of 6 ml (11 mm×11 mm×21 mm (length)).

TABLE 5

| Composition | Concentration (%) |
|---|---|
| CO | 2 |
| $H_2O$ | 10 |
| He | Balance |

A quartz reaction tube (inner diameter: 21 mm) was provided with a honeycomb catalyst and thermocouples (φ 0.5 mm, K pairs). The tips of 2 thermocouples were provided 10 mm above the upper end of the honeycomb catalyst and at the catalytic center. The reaction gas and the honeycomb catalyst were heated using the electric muffle furnace provided outside the quartz reaction tube. After the reaction gas and the honeycomb catalyst had been heated to the predetermined temperature, the reaction gas having the composition shown in Table 5 was allowed to pass through the catalyst layer. The catalyst inlet temperature was 200° C. The reaction gas was provided from various gas-charging tanks. The space velocity (SV) was determined to be 15,000 $h^{-1}$. Under such conditions, about 90 l of gas was used relative to 1 g of the Au catalyst coating per hour. After the reaction gas had passed through the catalyst layer, moisture was removed from the reaction gas with the use of a water trap, and the amount of generated hydrogen was inspected.

Figure 9:
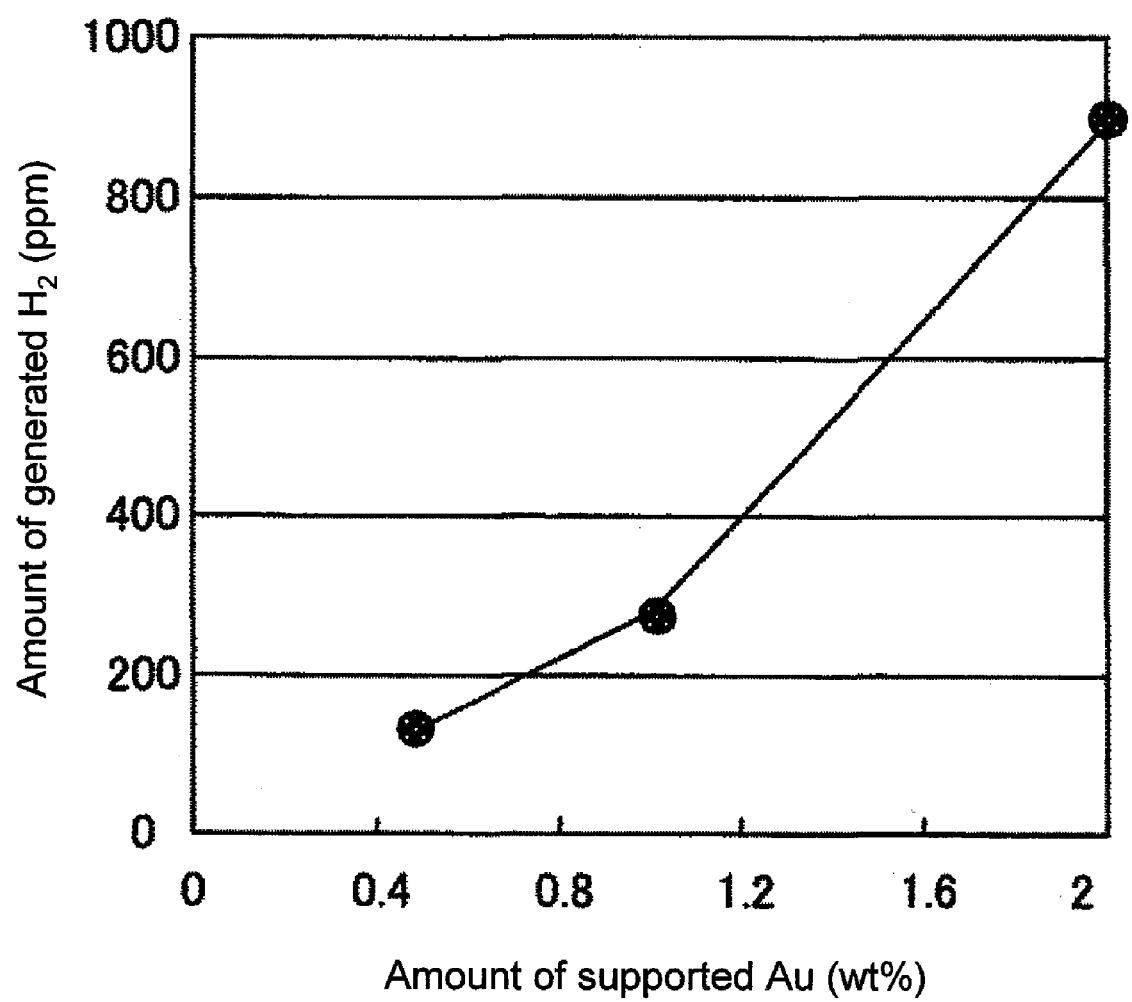
FIG. 9 shows dependence of the amount of generated hydrogen on the amount of supported Au.

FIG. 9 shows the results of inspecting the amount of generated hydrogen in accordance with the procedure of Test Example 3. By increasing the amount of supported Au from 0.5 wt % to 2 wt %, the amount of generated hydrogen was increased from 150 ppm to 900 ppm. This indicates that a larger amount of supported Au is preferable. Use of large amounts of noble metals, however, disadvantageously increases the catalyst cost. Thus, such an amount is particularly preferably between 2 wt % and 5 wt %.

Example 11

In the same manner in the case of Example 5, an inspection of the amount of generated hydrogen was implemented in accordance with Test Example 3 using a catalyst comprising a Ce–Zr carrier in which the Ce:(Ce+Zr) molar ratio was 0.2:1.0 to 0.8:1.0.

Figure 10:
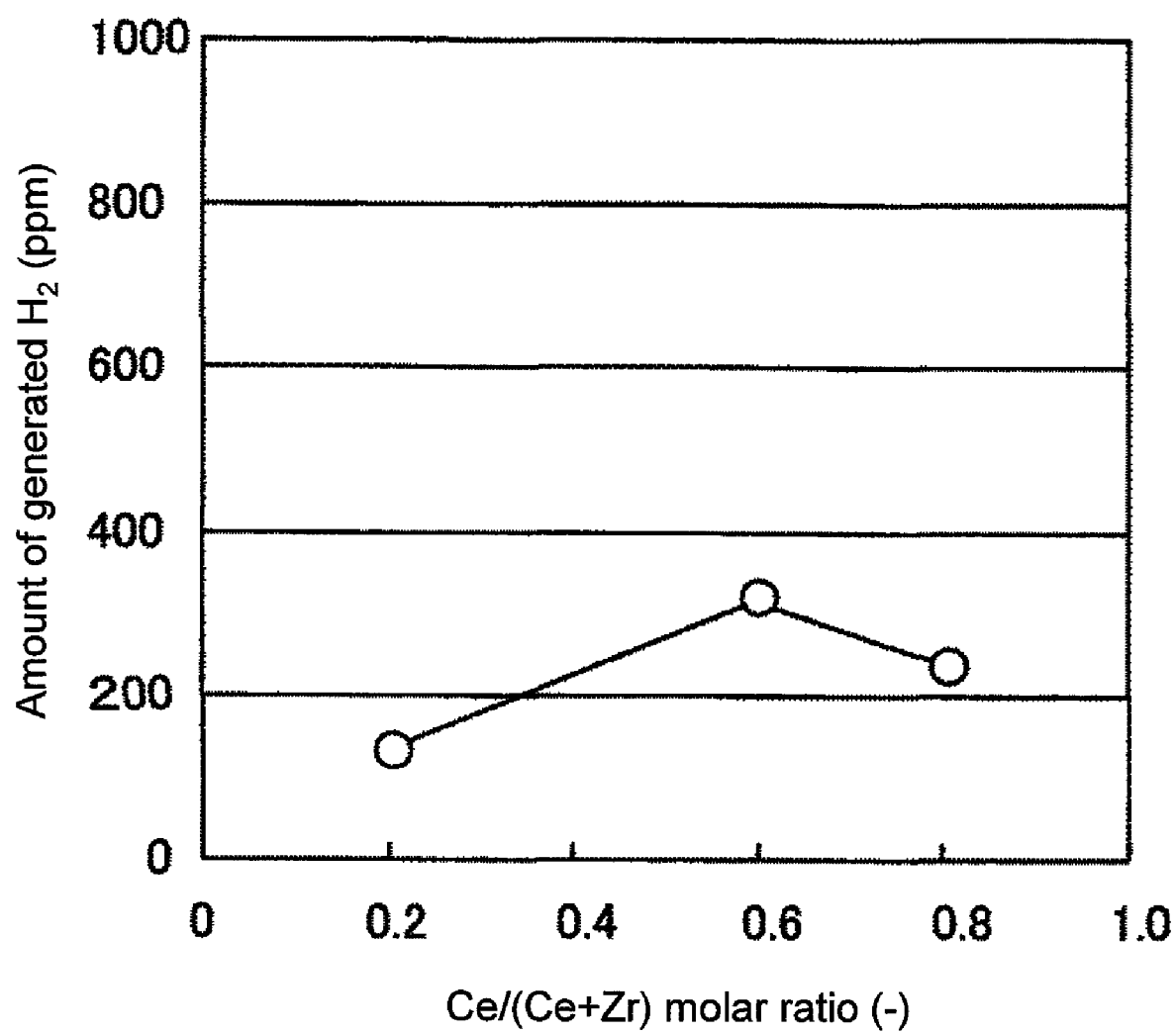
FIG. 10 shows dependence of the amount of generated hydrogen on Ce:(Ce+Zr) molar ratio.

Catalyst 5 of Example comprising Au supported thereon in an amount of 1 wt % was used. FIG. 10 shows the results. By setting the Ce:(Ce+Zr) molar ratio at 0.2:1.0 to 0.8:1.0, the amount of generated hydrogen became 180 ppm or more. Specifically, the maximum value of 325 ppm was attained with a Ce:(Ce+Zr) molar ratio of 0.6:1.0. According to the figure, a Ce:(Ce+Zr) molar ratio of 0.5:1.0 to 0.7:1.0 is preferable.

Example 12

Catalysts 7 to 9 of Example were prepared by replacing the carrier of Catalyst 5 of Example with a Zr-impregnated cerium oxide carrier ($Zr:CeO_2$).
(Catalyst 7 of Example)

Catalyst 7 of Example is an example of a catalyst prepared by replacing the carrier of Catalyst 5 of Example with a Zr-impregnated cerium oxide carrier ($Zr:CeO_2$).

The Zr-impregnated cerium oxide carrier ($Zr:CeO_2$) was prepared in the following manner. Zirconyl nitrate dihydrate was dissolved in purified water to prepare a Zr-containing solution. The cerium oxide carrier was impregnated with the Zr-containing solution until the Ce:(Ce+Zr) molar ratio reached 0.8:1.0 to prepare the Zr-impregnated cerium oxide. The Zr-impregnated cerium oxide was dehydrated and then baked at 600° C. for 1 hour.

Subsequently, Au was supported on $Zr:CeO_2$ in accordance with the same procedure as those used in case of Catalyst 2 of Example. The amount of the chloroauric acid solution was adjusted so as to bring the amount of supported Au to 1 wt % relative to $Zr:CeO_2$.

In the same manner as in the case of Catalyst 4 of Example, the Cordierite honeycomb form was coated with Au-supporting $Zr:CeO_2$ in amounts of 190 g per liter of the honeycomb to prepare Catalyst 7 of Example.

(Catalyst 8 of Example)

In the same manner as in the case of Catalyst 7 of Example, Catalyst 8 of Example was prepared by changing the Ce:(Ce+Zr) molar ratio of the Zr:$CeO_2$ carrier to 0.6:1.0.

(Catalyst 9 of Example)

In the same manner as in the case of Catalyst 7 of Example, Catalyst 9 of Example was prepared by changing the Ce:(Ce+Zr) molar ratio of the Zr:$CeO_2$ carrier to 0.9:1.0.

(Catalyst 3 of Comparative Example)

In the same manner as in the case of Catalyst 7 of Example, Catalyst 3 of Comparative Example was prepared by changing the Ce:(Ce+Zr) molar ratio to 1:1 (without Zr).

Example 13

Using Catalysts 7 to 9 of Example and Catalyst 3 of Comparative Example, the dependence of $N_2$ conversion on the Ce:Zr molar ratio of the Au-supporting Zr:$CeO_2$ carrier was inspected. Inspection was carried out in the same manner in the case of Test Example 2.

Figure 11:
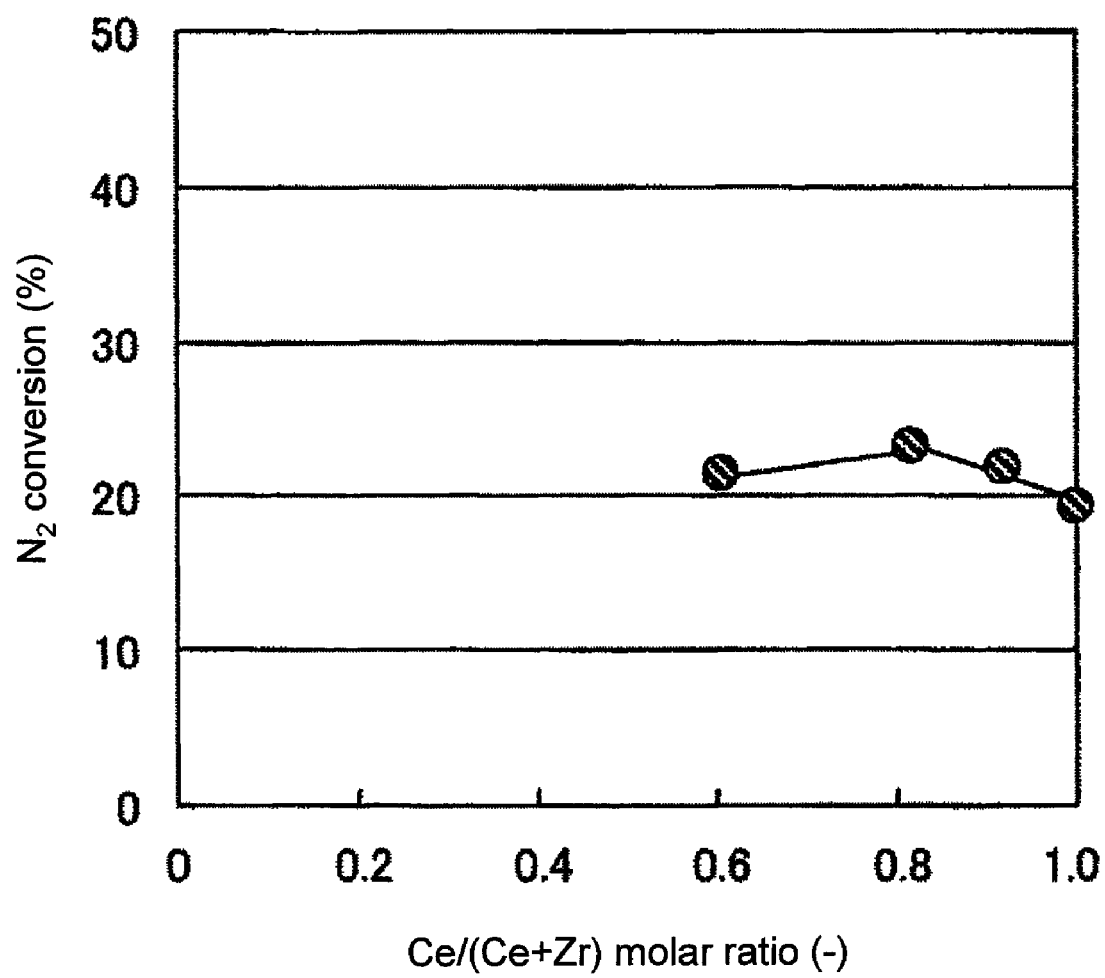
FIG. 11 shows dependence of $N_2$ conversion of Au-supporting $Zr:CeO_2$ on Ce:(Ce+Zr) molar ratio.

FIG. 11 shows $N_2$ conversion at 400° C. $N_2$ conversion was improved with the use of the Zr-supporting catalyst, compared with the use of the catalyst having the Ce:(Ce+Zr) molar ratio of 1:1 (Catalyst 3 of Comparative Example). The maximum value was attained with the Ce:(Ce+Zr) molar ratio of 0.8:1.0 (Catalyst 7 of Example). When the Ce:(Ce+Zr) molar ratio was adjusted to between 0.6:1.0 and 0.9:1.0, $N_2$ conversion was 20% or higher. In neither case was generation of $N_2O$ observed.

When zirconium is supported on a cerium-oxide-containing porous carrier, accordingly, a cerium:(cerium+zirconium) molar ratio between 0.6:1.0 and 0.9:1.0 is preferable.

Example 14

In the same manner in the case of Example 3, the percentage of CO purified with the aid of Catalyst 7 of Example at 100° C. to 300° C. was inspected. Table 6 shows the results. As is apparent from Table 6, Catalyst 7 of Example has excellent capacity for CO oxidation at low temperatures.

TABLE 6

| Temperature (° C.) | Catalyst 7 of Example |
|---|---|
| 100 | 78 |
| 150 | 92 |
| 175 | 97 |
| 200 | 100 |
| 300 | 100 |

Example 15

In accordance with the procedure of Test Example 3, the amounts of hydrogen generated with the aid of Catalysts 7 and 8 of Example were inspected. When the Ce:(Ce+Zr) molar ratio of Zr:$CeO_2$ was 0.8:1.0 (Catalyst 7 of Example), the amount of hydrogen generated was 292 ppm. When the Ce:(Ce+Zr) molar ratio was 0.6:1.0 (Catalyst 8 of Example), the amount of hydrogen generated was 310 ppm.

INDUSTRIAL APPLICABILITY

The present invention is effective as a method for purifying a gas component and as a method for producing hydrogen with high efficiency. The present invention can also be utilized as a catalyst for purifying gas components. Further, the present invention can be used as an apparatus for purifying exhaust gas discharged from an internal-combustion engine or an apparatus for generating hydrogen.

The invention claimed is:

1. A method for purifying gas comprising
    bringing gas in the case of combustion under lean fuel operation (lean combustion) having a higher value than the theoretical air fuel ratio into contact with a catalyst comprising a cerium-zirconium composite oxide carrier and gold supported on the carrier, and
    removing nitrogen oxide and carbon monoxide from the gas so that the reactivity between NO and CO is higher than that between $NO_2$ and CO,
    wherein the catalyst does not comprise a mixture of oxides.

2. The method according to claim 1, wherein the gas is exhaust gas from a boiler or internal-combustion engine.

3. The method according to claim 1, wherein the catalyst comprises only cerium-zirconium composite oxide and trace elements as an oxide.

4. The method according to claim 1, wherein the carrier is generated by coprecipitation.

* * * * *